US009654618B2

(12) United States Patent
Deleuze et al.

(10) Patent No.: US 9,654,618 B2
(45) Date of Patent: May 16, 2017

(54) ADJUSTING A VOLUME LEVEL OF A PHONE FOR A DETECTED HEARING AID

(71) Applicant: International Business Machines Corporation, Armonk, NY (US)

(72) Inventors: Ivan Deleuze, Montpellier (FR); Guilhaume Garcia, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/793,837

(22) Filed: Jul. 8, 2015

(65) Prior Publication Data

US 2017/0013117 A1    Jan. 12, 2017

(51) Int. Cl.
| | | |
|---|---|---|
| G06K 9/00 | (2006.01) | |
| H04M 1/725 | (2006.01) | |
| G06K 9/62 | (2006.01) | |
| G06F 3/16 | (2006.01) | |

(52) U.S. Cl.
CPC ........ H04M 1/72591 (2013.01); G06F 3/165 (2013.01); G06K 9/00362 (2013.01); G06K 9/6215 (2013.01)

(58) Field of Classification Search
None
See application file for complete search history.

(56) References Cited

U.S. PATENT DOCUMENTS

| 3,783,201 A | 1/1974 | Weiss et al. |
| 8,391,615 B2 | 3/2013 | Wu et al. |
| 9,049,983 B1* | 6/2015 | Baldwin .................. G06F 21/32 |
| 2008/0220809 A1* | 9/2008 | Hansen ..................... G03B 9/64 |
| | | 455/550.1 |
| 2008/0269926 A1* | 10/2008 | Xiang ...................... H03G 3/32 |
| | | 700/94 |
| 2013/0034234 A1 | 2/2013 | Chen et al. |
| 2013/0085549 A1 | 4/2013 | Case et al. |

(Continued)

FOREIGN PATENT DOCUMENTS

| JP | 2013175923 A  *  9/2013 |
| WO | WO2014049148    4/2014 |

OTHER PUBLICATIONS

Farhad Manjoo, Personal Tech, The New York Times, Conjuring Images of a Bionic Future, Apr. 23, 2014, 4 pages.

(Continued)

*Primary Examiner* — Daniel Lai
(74) *Attorney, Agent, or Firm* — Schmeiser, Olsen & Watts, LLP; Isaac J. Gooshaw (57) ABSTRACT

A system, method and computer program product for adjusting a volume level of a phone for a detected hearing aid. The phone has a camera and a speaker. The field of vision of the camera and field of sound transmission of the speaker overlap. The computer program product includes a computer-readable storage device having computer-readable program instructions therein. The method and the instruction perform the following steps: detecting an ear image of a user in one or more pictures of the user taken from the camera in preparation for a phone call; detecting a hearing aid image in conjunction with the ear image; and causing a volume level of the speaker to be set for hearing aid performance as a result of detecting the hearing aid image in conjunction with the ear image.

19 Claims, 6 Drawing Sheets

(56) References Cited

U.S. PATENT DOCUMENTS

| | | | |
|---|---|---|---|
| 2013/0235226 A1* | 9/2013 | Karn | H04N 5/23241 |
| | | | 348/220.1 |
| 2014/0211972 A1 | 7/2014 | Kim et al. | |
| 2014/0233774 A1 | 8/2014 | Kim et al. | |
| 2014/0270287 A1 | 9/2014 | Park | |
| 2014/0296619 A1 | 10/2014 | Case et al. | |
| 2015/0036835 A1* | 2/2015 | Chen | H04R 1/1041 |
| | | | 381/74 |
| 2015/0043748 A1* | 2/2015 | Sudo | H04R 17/00 |
| | | | 381/102 |
| 2015/0086055 A1* | 3/2015 | Kato | H04M 1/605 |
| | | | 381/334 |

OTHER PUBLICATIONS

Oticon, People First, Bluetooth SIG and EHIMA Partner to Advance Hearing Instrument Technology, Published on Mar. 21, 2014, 5 pages.

* cited by examiner

Hearing Aid Detection Module 300

Image Capture Engine 302

Ear Capture Engine 304

Hearing Aid Capture Engine 306

Inner Ear Shape Comparator 314A / Inner Ear Depth Comparator 314B

Phone Speaker Setting Switch 308

Phone Background Noise Controller 310

Threshold Counter 312

Hearing Aid Detection Method 400

Detecting Ear Image or Hearing Aid

501 Retrieve the series of pictures from the persistent memory

502 Compare pictures taken with camera in step 404 with the retrieved pictures to determine if image (ear image or hearing aid) is detected 503 If pictures taken with camera in step 404 match or do not match the retrieved pictures, then the image is detected or not detected, respectively

FIG. 5A

Initialize Image Detection

511 Take a series of pictures of the ear with and without the hearing aid in place 512 Save the series of pictures in the persistent memory

ADJUSTING A VOLUME LEVEL OF A PHONE FOR A DETECTED HEARING AID

TECHNICAL FIELD

The present invention relates to a phone, and to an associated method and computer program product, for adjusting a volume level of a speaker of the phone for a detected hearing aid.

BACKGROUND

More and more people are using hearing aids, not necessarily the hard of hearing, in order to enhance a capacity of people to communicate.

A hearing aid can be worn in any noisy environment such as a factory or a night club. At the same time, phones such as smart phones are heavily used by everybody and exist at a single point of control for peripheral devices such as: headsets; car phone kits; domotic devices; and hearing aids. In most cases, the communication between hearing aids and phones is based on classic network protocols such as Wi-Fi® (trademark of the Wi-Fi Alliance) or Bluetooth® (trademark of Bluetooth Sig. Inc.).

SUMMARY

The present invention provides a phone having a camera and a speaker, wherein the field of vision of the camera and a field of sound transmission of the speaker overlap. The phone includes a processor and a computer-readable storage device having computer-readable program instructions stored therein. The program instructions are executable by the processor to perform a method. The method includes the processor detecting an ear image of a user in one or more pictures of the user taken from the camera in preparation for a phone call; the processor detecting a hearing aid image in conjunction with the ear image; and the processor causing a switch to set a volume level of the speaker for hearing aid performance as a result of detecting the hearing aid image in conjunction with the ear image.

The present invention provides a method, and associated computer program product, for adjusting a speaker level of a phone for a detected hearing aid. The phone has a camera and a speaker, wherein a field of vision of the camera and a field of sound transmission of the speaker overlap. The phone: detects an ear image of a user in one or more pictures taken from the camera in preparation for a phone call; detects a hearing aid image in conjunction with the ear image; and causes a switch to set a volume level of the speaker for hearing aid performance as a result of detecting the hearing aid image in conjunction with the ear image.

BRIEF DESCRIPTION OF THE DRAWINGS

Embodiments of the present invention will now be described, by way of example only, with reference to the following drawings.

DETAILED DESCRIPTION

A problem with some phones and hearing aids is that some phones and hearing aids do not have a capability to communicate with each other and even if some phones and hearing aids are capable, then applications would be required on both devices to enable the communication. A hearing aid can configure itself to the intensity of a sound, but a phone does not have a way to know that the phone is being used in combination with a hearing aid. If a hearing aid is a generic aid without any kind of communication with a phone, then the phone will not be capable to configure volume settings depending on if a user is wearing the hearing aid or not.

In an embodiment of the invention, a phone having a camera and a speaker is provided, wherein a field of vision of the camera and a field of sound transmission of the speaker have some overlap, the phone comprising: a processor and a computer-readable storage device having computer-readable program instructions stored therein, the program instructions executable by the processor of the phone to perform a method comprising: said processor detecting an ear image of a user in one or more pictures taken from the camera in preparation for a phone call; said processor detecting a hearing aid image in conjunction with the ear image; and said processor causing a switch to set a volume level of the speaker for hearing aid performance as a result of detecting the hearing aid image in conjunction with the ear image.

In an embodiment of the invention, a method for adjusting a volume level of a phone for a detected hearing aid is provided, the phone having a camera and a speaker wherein a field of vision of the camera and a field of sound transmission of the speaker have some overlap, said method comprising: a processor of said phone detecting an ear image of a user in one or more pictures taken from the camera in preparation for a phone call; said processor detecting a hearing aid image in conjunction with the ear image; and said processor causing a switch to set a volume level of the speaker for hearing aid performance as a result of detecting the hearing aid image in conjunction with the ear image.

Embodiments of the invention contemplate detection of the presence or absence of a hearing aid, where in one embodiment, the front camera and speaker are adjacent, and a user's ear is resting against both the camera and the speaker.

In an embodiment of the invention, a computer program product for configuring a phone for a hearing aid is provided, the phone having a camera and a speaker wherein a field of vision of the camera and a field of sound transmission of the speaker overlap, the computer program product comprising a computer-readable storage device having computer-readable program instructions stored therein, the program instructions executable by a processor of the phone to perform the following steps: detecting an ear image of a user in one or more pictures of the user taken from the camera in preparation for a phone call; detecting a hearing aid image in conjunction with the ear image; and causing a volume level of the speaker to be set for hearing aid performance as a result of detecting the hearing aid image in conjunction with the ear image.

Figure 1:
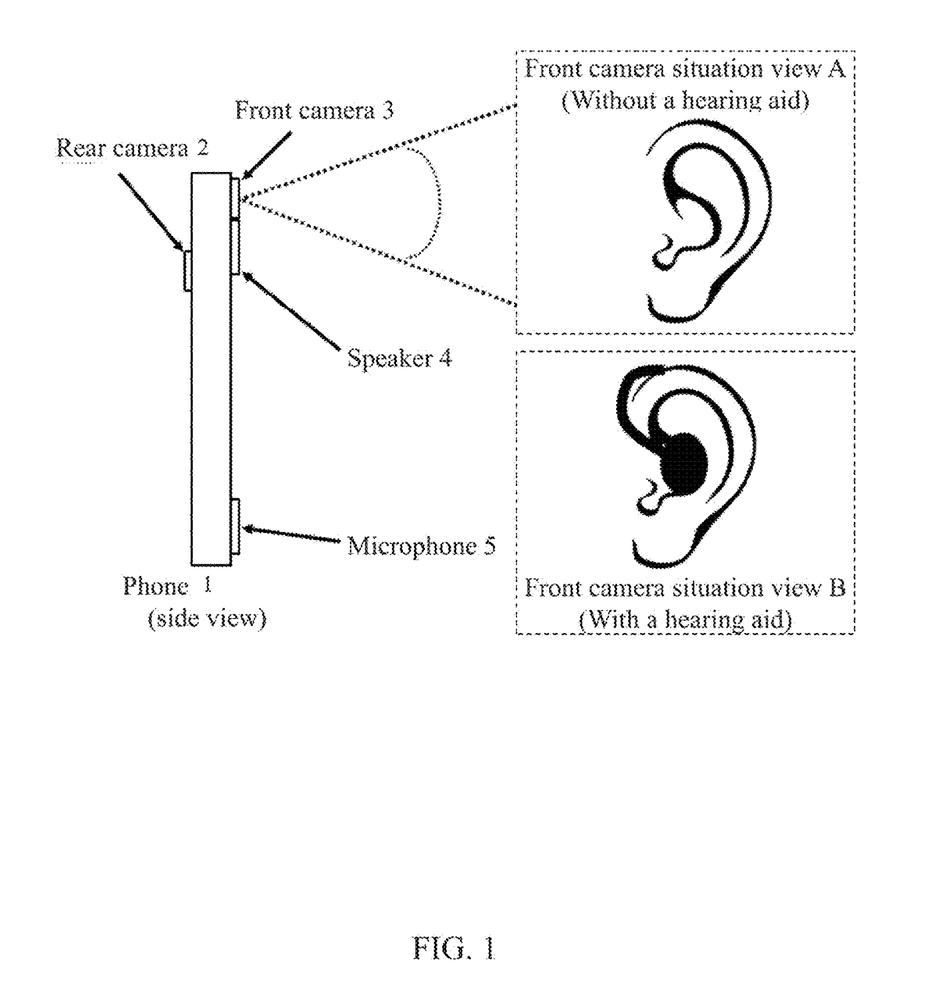
FIG. 1 depicts an example of a phone in two situations: without a hearing aid and with a hearing aid, in accordance with embodiments of the present invention.

FIG. 1 depicts an example of a phone in two situations: view A—without a hearing aid; and view B—with a hearing aid, in accordance with embodiments of the present invention. Phone 1 can be a mobile phone, such as a smart phone, and includes: rear camera 2; front camera 3; speaker 4 and microphone 5. The dotted lines from front camera 3 represent a schematic and idealized view from front camera 3 of view A (shown in a dashed line box) where an ear is presented to phone 1 without a hearing aid. When an ear is presented to phone 1, then the view from front camera 3 will be view B (also shown in a dashed line box). Based on whether view A or view B is detected, the solution will decide whether to use a hearing aid volume level for speaker 4 or a non-hearing aid volume level. Other sound characteristics such as filters on base or treble frequencies may be set depending on the presence or absence of a hearing aid. Also, if there is no hearing aid, then phone 1 will adapt the volume level of speaker 4 as function of the background noise, which is normally performed by a hearing aid.

Embodiments of the present invention are self-adaptive. If the user manually changes the volume level of speaker 4 during a communication, then embodiments of the present invention will store this information and use this information for the next call, or later during an existing call, in order to provide the best volume level possible.

Figure 2:
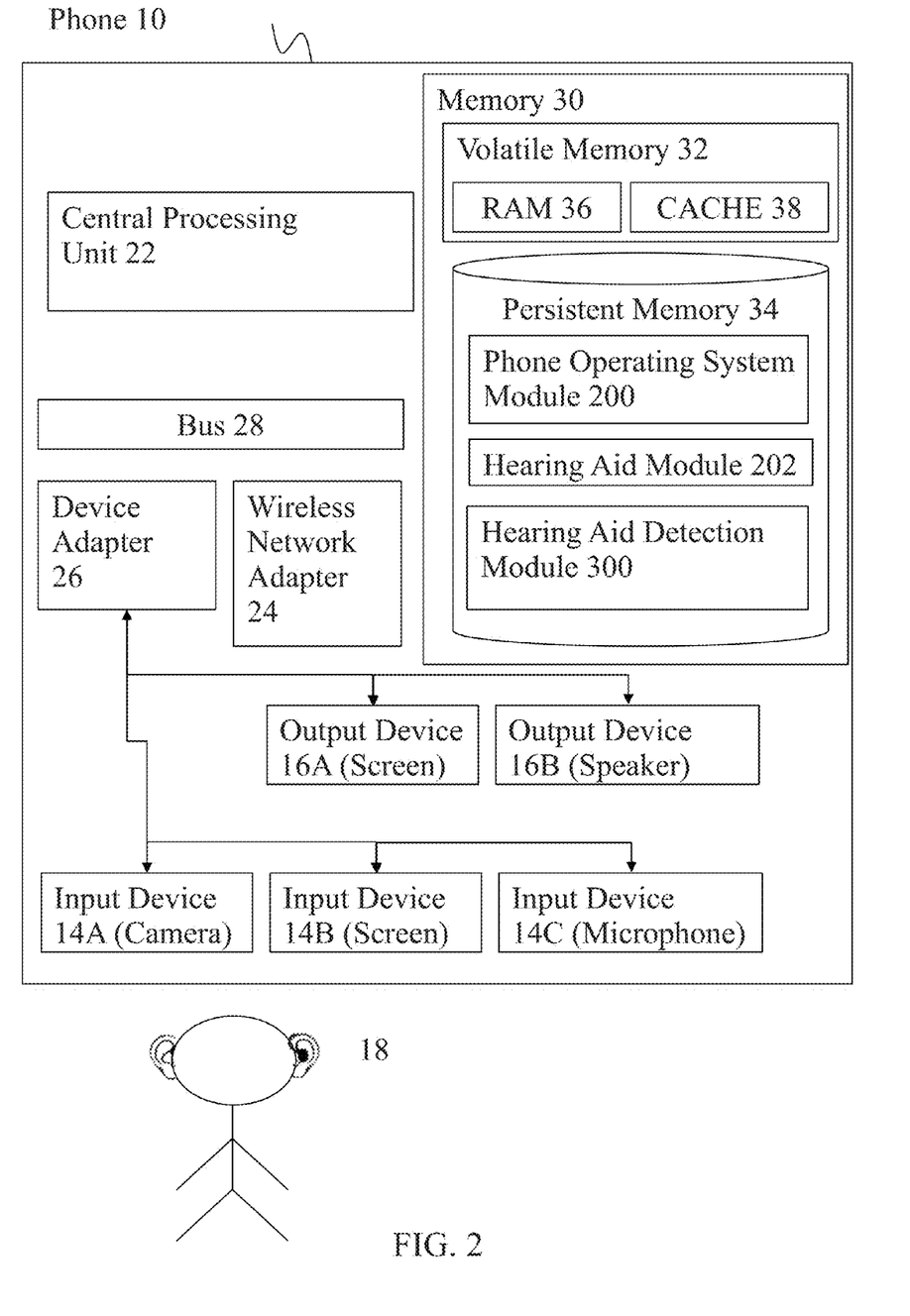
FIG. 2 depicts a phone and a user, in accordance with embodiments of the present invention.

FIG. 2 depicts a phone 10 and a user 18, in accordance with embodiments of the present invention. Phone 10 is operational with numerous other general purpose or special purpose computing system environments or configurations. Examples of well-known computing processing systems, environments, and/or configurations that may be suitable for use with phone 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices.

Phone 10 may be described in the general context of computer system executable instructions, such as program modules, being executed by a computer processor. Generally, program modules may include routines, programs, objects, components, logic, and data structures that perform particular tasks or implement particular data types.

Phone 10 includes: one or more input devices 14; output devices 16; central processing unit (CPU) 22; wireless network adapter 24; device adapter 26; bus 28 and memory 30.

Phone 10 communicates with a user 18 using input devices 14 and output devices 16. Input devices 14 include one or more of: a camera (14A) (for example front camera 3), a touch sensitive screen (14B), and a microphone (14C). Output devices 16 include one or more of a display screen (16A) which may be touch sensitive and a speaker (16B) (for example speaker 4). Phone 10 communicates with other phones over a network (not shown). The network can be a global system for mobile devices (GSM) network or a third generation mobile phone (3G) network or another other type of network for phones.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. The CPU 22 can perform many different machine operations. A set of machine instructions is called a machine code program. The machine instructions are written in a machine code language which is referred to a low level language. A computer program written in a high level language needs to be compiled to a machine code program before the computer program can be run. Alternatively a machine code program such as a virtual machine or an interpreter can interpret a high level language in terms of machine operations.

Wireless network adapter 24 connects bus 28 with a mobile phone network for enabling communication between the phone 10 and other phones on the mobile phone network.

Device adapter 26 is connected to bus 28 and input devices 14 and output devices 16 for enabling communication.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster, and generally non-volatile memory is used because it will hold the data for longer. Phone 10 may further include other removable and/or non-removable, volatile and/or non-volatile computer system storage media. As will be further depicted and described below, memory 30 may include at least one program product having a set (for example, at least one) of program modules that are configured to carry out the functions of embodiments of the invention.

The set of program modules configured to carry out the functions of embodiments of the present invention comprises phone operation system module 200, hearing aid module 202 and hearing aid detection module 300. In one embodiment, ROM in the memory 30 stores modules that enable phone 10 to function. Further program modules that support embodiments of the present invention but are not shown include firmware, a boot strap program, and support applications. Each of the operating system, support applications, other program modules, and program data or some combination thereof, may include an implementation of a networking environment.

Phone operating system module 200 enables phone 10 to function as a phone and, in this case, also as a camera.

Hearing aid module 202 enables phone 10 to function in conjunction with a hearing aid, for instance by optimizing the volume of speaker 4 for hearing aid use.

Hearing aid detection module 300 comprises features of embodiments of the present invention and is described in more detail in relation to FIGS. 3, 4, 5A, 5B and 6.

Figure 3:
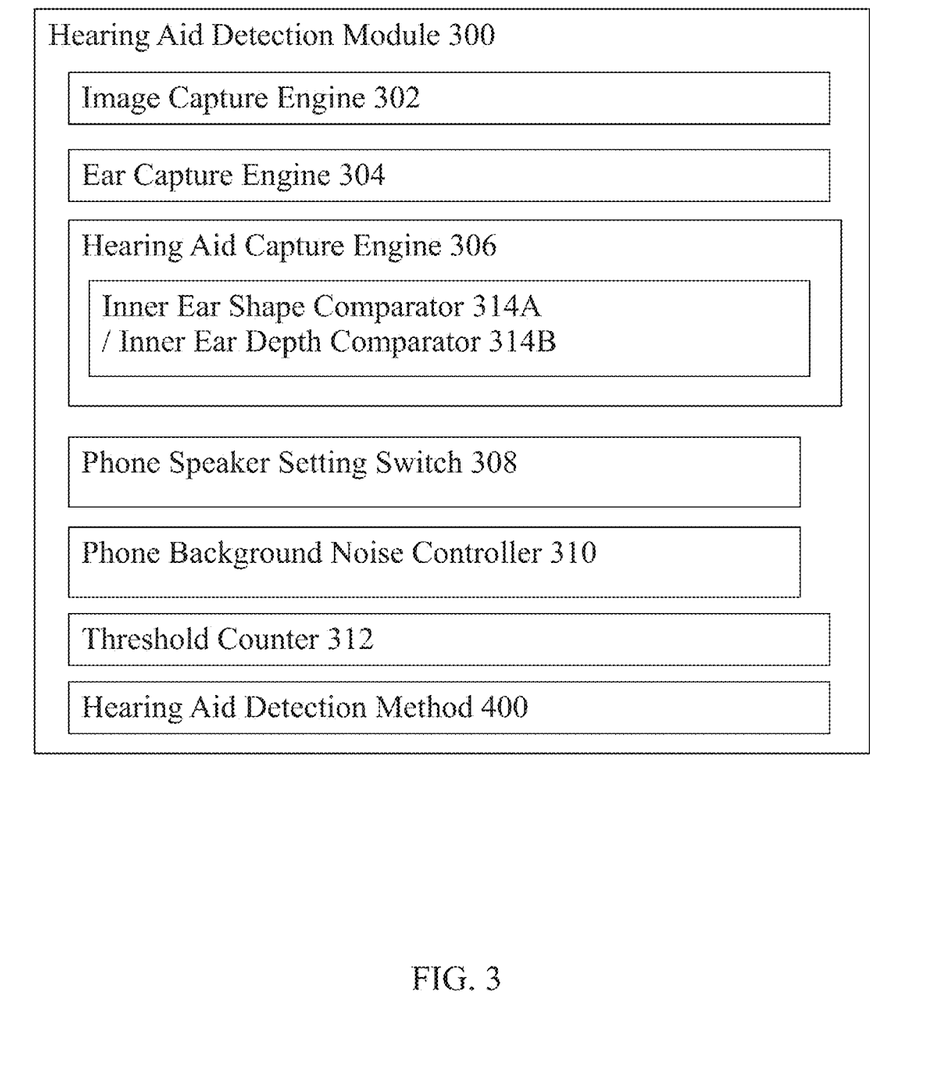
FIG. 3 depicts a hearing aid detection module existing within the phone of FIG. 2, in accordance with embodiments of the present invention.

FIG. 3 depicts a hearing aid detection module 300, in accordance with embodiments of the present invention. The hearing aid detection module 300 includes: image capture engine 302; ear capture engine 304; hearing aid capture engine 306; phone speaker setting switch 308; phone background noise controller 310; threshold counter 312 and hearing aid detection method 400.

Image capture engine 302 is for capturing an image of the side of a user's head, for example, when a user is about to make or is making a call. The trigger for this can be the event of making a call.

Ear capture engine 304 is for identifying an ear shape pattern in the head image.

Hearing aid capture engine 306 is for identifying a shape pattern from the inner part of the ear shape pattern.

The hearing aid capture engine 306 comprises an inner ear shape comparator 314A for comparing shapes of inner ear images to match against actual inner ear shapes or against hearing aid shapes. The method of inner ear shape comparator 314A is described with respect to FIG. 5A.

In one embodiment, hearing aid capture engine 306 comprises inner ear depth comparator 314B.

Phone speaker setting switch 308 is for controlling the phone speaker volume and frequencies appropriately if a hearing aid is detected or not.

Phone background noise controller 310 is for controlling the phone speaker volume and frequencies appropriately.

Threshold counter 312 is for stopping image capture and analysis after a threshold amount of time.

Figure 4:
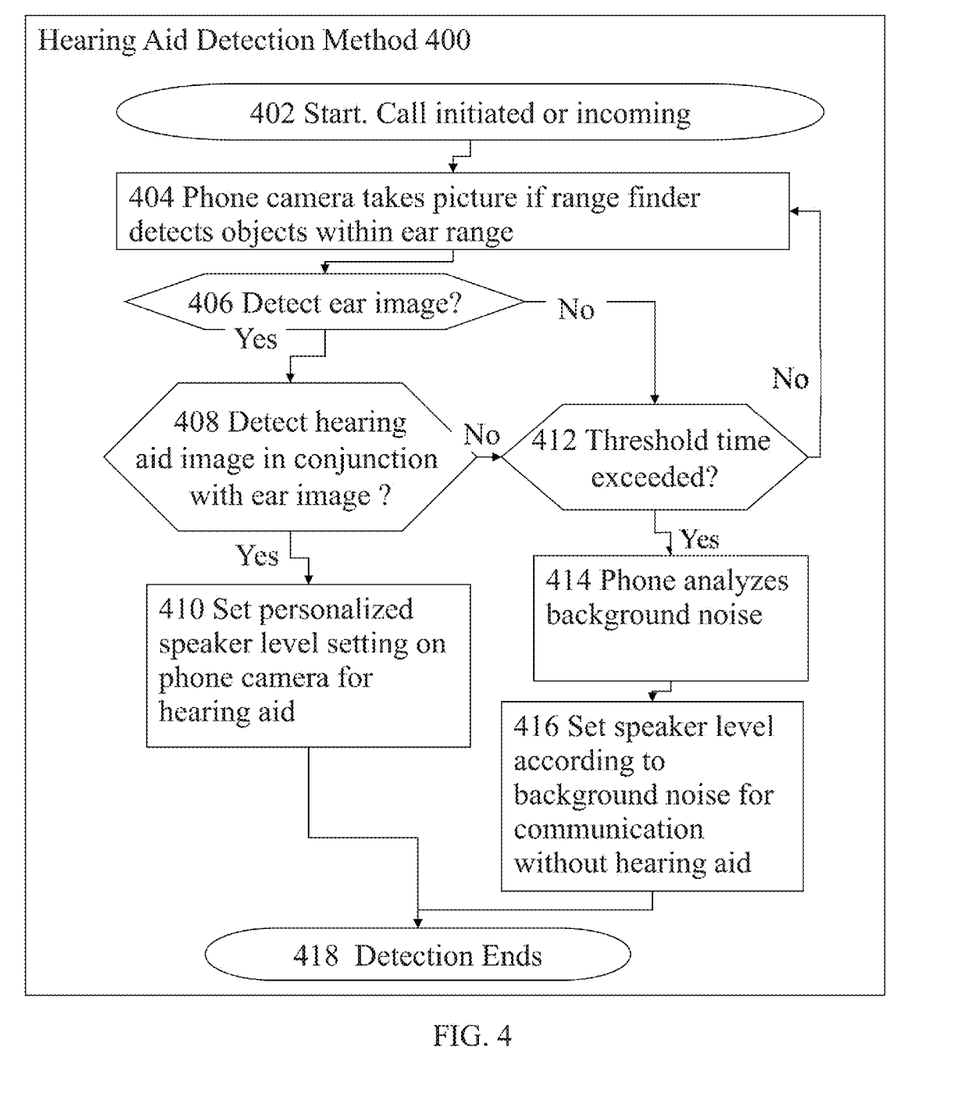
FIG. 4 is a flow diagram of a hearing aid detection method, in accordance with embodiments of the present invention.

Hearing aid detection method 400 of FIG. 4 is a method for controlling the components of the hearing aid detection module 300.

FIG. 4 depicts a hearing aid detection method 400, in accordance with embodiments of the present invention. The hearing aid detection method 400 comprises steps 402 to 418.

Step 402 initiates the method when a call is initiated or incoming.

Step 404 takes a picture of an object, using a camera in the phone, after the method start and/or if the phone range finder detects the object within ear range. In one embodiment, a picture is taken in preparation for the phone call if a phone range finder detects objects within a range associated with the user's ear range. In one embodiment, such an ear range is a human's arm length.

Figure 5A:
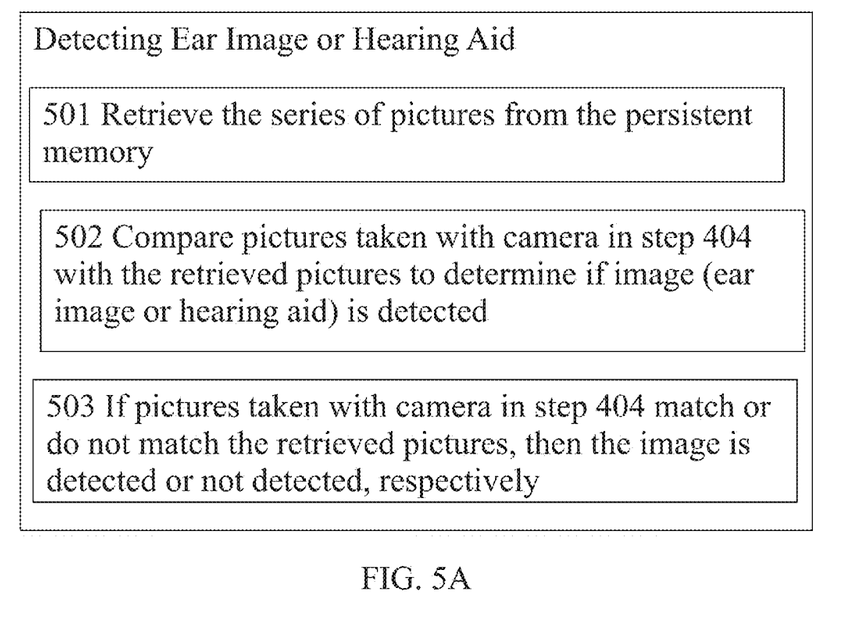
FIGS. 5A and 5B are flow diagrams of processes for detecting an ear image or a hearing aid, in accordance with embodiments of the present invention.

Step 406 determines whether an ear image is detected, which is described infra in more detail in conjunction with FIG. 5A. If such an ear image is detected, then step 408 is performed, else step 412 is performed.

Step 408 determines whether a hearing aid image in conjunction with a detected ear image is detected, which is described infra in more detail in conjunction with FIG. 5A. If such a hearing aid image is detected then step 410 is performed, else step 412 is performed.

Figure 6:
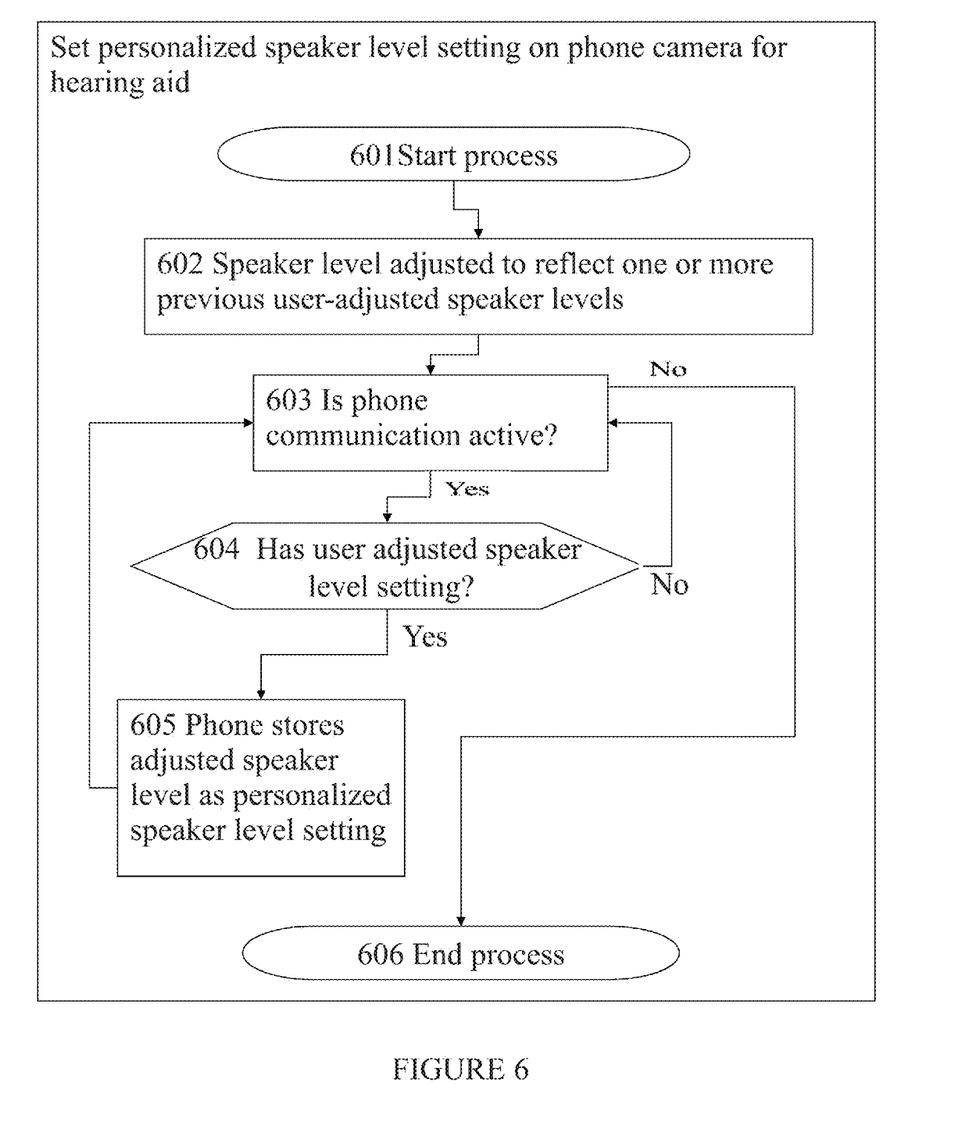
FIG. 6 is a flow diagram for setting a volume level of a speaker of a phone for a hearing aid, in accordance with embodiments of the present invention.

Step 410 causes the setting of a personalized volume level setting of a speaker of the phone for a hearing aid, which is described infra in more detail in conjunction with FIG. 6. Then the hearing aid detection method 400 ends at step 418.

Step 412 checks if detecting ear images or hearing aid images has exceeded a predetermined or specified threshold time and goes to step 414 if so, else step 404 is next performed to capture more images. This embodiment therefore comprises causing the phone to take a second picture or pictures for detection if no ear image is detected in the first picture or pictures and also comprises taking further pictures for detection if no hearing aid image or ear image is detected.

Step 414 analyzes background noise.

Step 416 causes the setting of the volume level of the speaker according to background noise for communication without a hearing aid. Then the hearing aid detection method 400 ends at step 418.

Step 418 ends the hearing aid detection method 400.

Figure 5B:
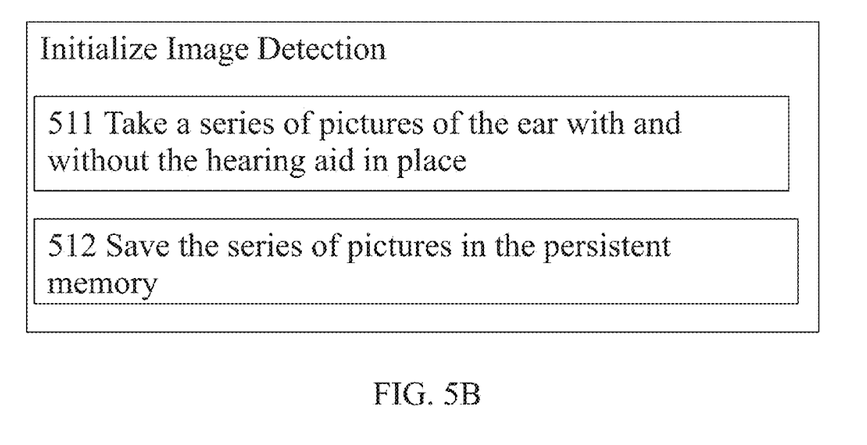

FIGS. 5A and 5B are flow diagrams of processes for detecting an ear image (step 406) or a hearing aid (step 408), in accordance with embodiments of the present invention.

FIG. 5B depicts an initialization process 510 for the image detection process of FIG. 5A. The initialization process 510 is performed before the hearing aid detection method 400 of FIG. 4 is performed. The hearing aid detection method 400 is used to detect an ear image (step 406) or a hearing aid image (step 408). The initialization process 510 comprises steps 511 and 512.

Step 511 takes a series of pictures of the user's ear with and without the hearing aid in place. The series of pictures serve as reference pictures, for comparison with pictures taken by the camera in step 404, for detecting an ear image in step 406 and for detecting a hearing aid image in step 408.

Step 512 save the series of pictures in the persistent memory 34.

FIG. 5A depicts an image detection process that detects an image, namely an ear image (step 406) or a hearing aid image (step 408). The image detection process of FIG. 5A comprises steps 501-503.

Step 501 retrieves the series of pictures from the persistent memory 34. The series of pictures was previously stored in the persistent memory 34 in step 512 of the initialization process of FIG. 5B.

Step 502 compares pictures taken with the camera in step 404 with the pictures retrieved in step 501 to determine if the image (ear image or hearing aid) is detected.

Step 503 determines that the result of the comparison in step 502 is that the pictures taken with camera in step 404 match or do not match the pictures retrieved in step 501.

Techniques for implementing the image detection process of steps 501-503 are well known by a person of ordinary skill in the art. See, for example, the image recognition algorithm described in U.S. Pat. No. 8,391,615 issued Mar. 5, 2013 to Wu et al.

FIG. 6 is a flow diagram for setting a personalized volume level of a speaker of a phone for a hearing aid, in accordance with embodiments of the present invention. The process of FIG. 6 implements step 410 of FIG. 4. The process of FIG. 6 comprises steps 601-606.

Step 601 starts the process.

Step 602 adjusts the volume level to reflect one or more user-adjusted volume levels previously stored in persistent memory 34 in step 605. If there is no stored personalized volume level (e.g., before the first execution of step 605), then a predetermined default volume level is used.

In one embodiment, step 602 selects the latest saved personalized volume level for the hearing aid (i.e., the last volume level previously stored in persistent memory 34 via step 605). In one embodiment, step 602 calculates an average ($A_N$) of the last N volume levels stored in persistent memory 34 via step 605, wherein N is a predetermined or user-specified positive integer of at least 2 (e.g., N=2, 3, 4, 5, 6, 7, 8, 9, 10, . . . ). The last N volume levels are denoted as $L_1, L_2, \ldots, L_N$, wherein $L_1$ is the latest volume level stored, $L_2$ is the $2^{nd}$ latest level stored, . . . , and $L_N$ is the $N^{th}$ latest volume level stored. In other words, volume level $L_1$ is stored after volume level $L_2$ is stored and volume level $L_2$ is stored after volume level $L_N$ is stored.

In one embodiment, the average (AN) is an unweighted arithmetic average of the last N volume levels stored in persistent memory 34 via step 605.

In one embodiment, the average ($A_N$) is a weighted linear combination of the last N volume levels stored in persistent memory 34 via step 605; i.e., $A_N = W_1 L_1 + W_2 L_2 + \ldots W_N L_N$, wherein the weights $W_1, W_2, \ldots W_N$ are normalized such that the sum of the weights is 1, and wherein $W_1 > W_2 > \ldots > W_N$, which reflects increased weight given to more recently stored volume levels. For example, the weights Wn (n=1, 2, ..., N) may be inversely proportional to n (i.e., Wn/Wn+1=(n+1)/n for n=1, 2, ..., N−1).

In one embodiment, the average (AN) is a weighted nonlinear combination of the last N volume levels stored in persistent memory 34 via step 605; i.e., $A_N = W_1 f_1(L_1) + W_2 f_2(L_2) + \ldots W_N f_N(L_N)$, wherein $f_j(L_j)$ denotes a function of $L_j$ (j=1, 2, ..., or N), and wherein at least one function of the N functions $f_1, f_2, \ldots, f_N$ is a nonlinear function. For example, $A_N$ may have the following nonlinear form: $A_N = W_1 (L_1)^P + W_2 (L_2)^P + \ldots W_N (L_N)^P$ subject to $W_1 > W_2 > \ldots > W_N$, wherein P is a real number greater than 1 (e.g., P=2, 2.5, 3, etc.) or P is a real number less than 1 (e.g., P=⅓, ½, etc.).

The last N volume levels were stored in persistent memory 34 during one or more phone calls. In one embodiment, all N volume levels were stored in persistent memory 34 during the current phone call. In one embodiment, all N volume levels were stored in persistent memory 34 during one or more phone calls that occurred prior to the current phone call. In one embodiment, m volume levels of the N volume levels were stored in persistent memory 34 during the current phone call, and N-m volume levels of the N volume levels were stored in persistent memory 34 during one or more phone calls that occurred prior to the current phone call, wherein 1≤m<N.

Step 603 determines whether the phone communication is active. If so, step 604 is next executed. If not, step 606 is next executed which ends the process.

Step 604 determines whether the user has adjusted the volume level setting which the user can do any time while the phone communication is active (as determined in step 603). If it is determined that the user has adjusted the volume level, step 605 is executed next. If it is determined that the user has not adjusted the volume level, the process loops back to 603 to again determine whether the phone communication is active.

Step 605 stores, in persistent memory 34, a personalized volume level setting of the user, namely the user adjusted volume level determined in step 604, and then loops back to step 603.

Step 606 ends the process.

Embodiments of the present invention provide phones for detecting if the phones are being used or not being used with a hearing aid and for configuring the volume or other settings of the speaker. Visual detection is a simple method of detection that provides a solution.

Some users who are using hearing aids remove the hearing aids from time to time. Embodiments of the present invention provide a method and system for a phone to adapt whenever a hearing aid is removed or put back.

Embodiments of the present invention ensure a more uniform quality of conversations in the case of a person using a hearing aid.

Embodiments of the present invention do not rely on a specific communication protocol and can work with all hearing aids that fit in the ear.

Embodiments of the present invention aim at preventing sound quality problems when a user is receiving a call without a hearing aid. Thanks to the latest technologies including achievements in the mobile phone industry, a large amount of phones have two cameras. Embodiments of the present invention use the camera that will be close to the speaker in order to detect if the receiver of the call is wearing a hearing aid or not.

A user can enter personal requirements into a phone and the phone can perform a test, after which the camera will operate in two modes: the user is wearing the hearing aid; and the user is not wearing the hearing aid.

It will be clear to one of ordinary skill in the art that all or part of the logical process steps of the embodiments of the present invention may be alternatively embodied in at least one logic apparatus comprising logic elements arranged to perform the logical process steps of the method and that such logic elements may comprise hardware components, firmware components or a combination thereof.

It will be equally clear to one of skill in the art that all or part of the logic components of embodiments of the present invention may be alternatively embodied in at least one logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Embodiments of the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of embodiments of the present invention may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises a computer readable hardware storage medium/device having computer readable program code stored therein, said program code containing instructions executable by a processor to implement the methods of the present invention.

It will be clear to one skilled in the art that many improvements and modifications can be made to the foregoing exemplary embodiment without departing from the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A phone having a camera and a speaker, wherein a field of vision of the camera and a field of sound transmission of the speaker overlap, said phone comprising a processor and a computer-readable storage device having computer-readable program instructions stored therein, the program instructions executable by the processor of the phone to perform a method comprising:

said processor detecting an ear image of a user in one or more pictures of the user taken from the camera in preparation for a phone call;

said processor detecting a hearing aid image in conjunction with the ear image; and said processor causing a switch to set a volume level of the speaker for hearing aid performance as a result of said detecting the hearing aid image in conjunction with the ear image.

2. The phone of claim 1, wherein said detecting the hearing aid image in conjunction with the ear image comprises: comparing the one or more pictures with reference images of an ear with a hearing aid in place.

3. The phone of claim 1, wherein said detecting the ear image comprises: comparing the one or more pictures with reference images of an ear.

4. The phone of claim 1, wherein said causing the volume level of the phone to be set comprises causing the volume level of the phone to be set based on a type of the hearing aid detected in the hearing aid image.

5. The phone of claim 1, said method further comprising:

after said causing the switch to set the volume level of the speaker for hearing aid performance, said processor causing the phone to take a second picture of the user;

said processor detecting the ear image of the user in the second picture of the user; and said processor not detecting in the second picture of the user the hearing aid image in conjunction with the ear image.

6. The phone of claim 5, said method further comprising: said processor causing the phone to take pictures until a threshold time is reached.

7. The phone of claim 5, wherein said causing the volume level of the phone to be set comprises causing the volume level of the phone to be set according to background noise for communication without the hearing aid.

8. The phone of claim 1, said method further comprising: said processor causing the phone to take a second picture if no hearing aid image or ear image is detected in a first picture taken from the camera.

9. The phone of claim 1, said method further comprising: said processor causing the phone to take a picture in preparation for a phone call in response to a phone range finder detecting objects within a range associated with a user ear range.

10. A method for adjusting a volume level of a phone for a detected hearing aid, said phone having a camera and a speaker, wherein a field of vision of the camera and a field of sound transmission of the speaker overlap, said method comprising:

a processor of said phone detecting an ear image of a user in one or more pictures of the user taken from the camera in preparation for a phone call;

said processor detecting a hearing aid image in conjunction with the ear image; and said processor causing a switch to set a volume level of the speaker for hearing aid performance as a result of said detecting the hearing aid image in conjunction with the ear image.

11. The method of claim 10, wherein said detecting the hearing aid image in conjunction with the ear image comprises: comparing the one or more pictures with reference images of an ear with a hearing aid in place.

12. The method of claim 10, wherein said detecting the hearing aid comprises: comparing the one or more pictures with reference images of an ear.

13. The method of claim 10, said processor causing the speaker level of the phone to be set comprises causing the volume level of the phone to be set based on a type of a hearing aid detected in the hearing aid image.

14. The method of claim 10, said method further comprising:

after said causing the switch to set the volume level of the speaker for hearing aid performance, said processor causing the phone to take a second picture of the user;

said processor detecting the ear image of the user in the second picture of the user; and said processor not detecting in the second picture of the user the hearing aid image in conjunction with the ear image.

15. The method of claim 14, said method further comprising:

said processor causing the phone to take pictures until a threshold time is reached.

16. The method of claim 14, wherein said processor causing the volume level of the phone to be set comprises causing the volume level of the phone to be set according to background noise for communication without the hearing aid.

17. The method of claim 10, said method further comprising:

said processor causing the phone to take a second picture in response to no hearing aid image or ear image being detected in a first picture taken from the camera.

18. The method of claim 10, said method further comprising:

said processor causing said phone to take a picture in preparation for a phone call in response to a phone range finder detecting objects within a range associated with a user ear range.

19. A computer program product for configuring a phone for a hearing aid, the phone having a camera and a speaker, wherein a field of vision of the camera and a field of sound transmission of the speaker overlap, the computer program product comprising a computer-readable storage device having computer-readable program instructions stored therein, the program instructions executable by a processor of the phone to perform the steps of:

said processor detecting an ear image of a user in one or more pictures of the user taken from the camera in preparation for a phone call;

said processor detecting a hearing aid image in conjunction with the ear image; and said processor causing a switch to set a volume level of the speaker for hearing aid performance as a result of said detecting the hearing aid image in conjunction with the ear image.

* * * * *